(12) United States Patent
Yee et al.

(10) Patent No.: US 11,797,812 B2
(45) Date of Patent: Oct. 24, 2023

(54) COMPACT TRANSACTION CARD

(71) Applicant: Capital One Services, LLC, McLean, VA (US)

(72) Inventors: Bryant Yee, Washington, DC (US); Tyler Maiman, Melville, NY (US); Viraj Chaudhary, Katy, TX (US)

(73) Assignee: Capital One Services, LLC, McLean, VA (US)

( * ) Notice: Subject to any disclaimer, the term of this patent is extended or adjusted under 35 U.S.C. 154(b) by 25 days.

(21) Appl. No.: 17/462,702

(22) Filed: Aug. 31, 2021

(65) Prior Publication Data

US 2023/0065729 A1    Mar. 2, 2023

(51) Int. Cl.
*G06K 19/06* (2006.01)
*G06K 19/077* (2006.01)

(52) U.S. Cl.
CPC ..... *G06K 19/06196* (2013.01); *G06K 19/077* (2013.01)

(58) Field of Classification Search
CPC ....... G06K 19/06187; G06K 19/07743; G06K 19/06046; G06K 19/06196; G06K 19/077; G06K 19/07701; G06K 19/07745
See application file for complete search history.

(56) References Cited

U.S. PATENT DOCUMENTS

| | | | |
|---|---|---|---|
| 6,471,127 B2 * | 10/2002 | Pentz | B42D 25/369 |
| | | | 235/487 |
| 10,311,350 B2 | 6/2019 | Suthar | |
| 2005/0205665 A1 | 9/2005 | Lasch et al. | |
| 2019/0073575 A1* | 3/2019 | Suthar | G06K 19/07 |

FOREIGN PATENT DOCUMENTS

| | | | | |
|---|---|---|---|---|
| JP | H01120691 A | * | 5/1989 | |
| WO | WO-2021030782 A2 | * | 2/2021 | G06K 19/0718 |

OTHER PUBLICATIONS

Pellegrini et al., "Grip strength and exposure to hue differences in visual stimuli: Is postural status a factor?" (Year: 1981).*

* cited by examiner

*Primary Examiner* — Thien T Mai
(74) *Attorney, Agent, or Firm* — KDW Firm PLLC

(57) ABSTRACT

Provided are compact transaction cards. In some approaches, a transaction card may include a body having first and second main sides, a first and second end perimeter perimeters, and first and second side perimeters, wherein a first axis extending between the first and second side perimeters defines a first section of the body and a second section of the body. The card may further include an identification chip along the first main side and a magnetic stripe along the second main side, wherein the magnetic stripe extends between the first and second side perimeters, and wherein the magnetic stripe and the identification chip are located on the first section of the body. The card may further include a textured grip along at least one of the first main side and the second main side, wherein the textured grip is positioned only on the second section of the body.

20 Claims, 3 Drawing Sheets

COMPACT TRANSACTION CARD

FIELD

Embodiments of the present disclosure relate to transaction cards and, more particularly, to transaction cards with reduced dimensions.

BACKGROUND

Transaction cards, such as credit and debit cards, are one of the primary means for individuals to complete transactions involving data exchange. Many other forms of cards are also widely used, such as identification cards, loyalty cards, prescription cards, insurance cards, etc. Transaction cards are typically sized according to standards set by the International Organization for Standardization (ISO). This means that most transaction cards being utilized are of the same size and dimensions, typically about 2.5 inches by about 3 inches in a generally rectangular configuration. However, a transaction card having dimensions according to this standard may be relatively large.

In some instances, it may be desirable to reduce the size of transaction cards while still maintain expected functionality. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body comprising a first main side opposite a second main side, a first end perimeter opposite a second end perimeter, and a first side perimeter opposite a second side perimeter, wherein a first axis extending between the first side perimeter and the second side perimeter defines a first section of the body and a second section of the body. The transaction card may further include an identification chip along the first main side of the body and a magnetic stripe along the second main side of the body, wherein the magnetic stripe extends between the first side perimeter and the second side perimeter, and wherein the magnetic stripe and the identification chip are located on the first section of the body, and a textured grip along at least one of the first main side of the body and the second main side of the body, wherein the textured grip is positioned only on the second section of the body.

In another approach according to the disclosure, a compact transaction card may include a body comprising a first main side opposite a second main side, an insertion end perimeter opposite a second end perimeter, and a first side perimeter opposite a second side perimeter, wherein a first axis extending between the first side perimeter and the second side perimeter defines a first section of the body and a second section of the body. The compact transaction card may further include an identification chip along the first main side of the body and a magnetic stripe along the second main side of the body, wherein the identification chip is positioned closer to the insertion end perimeter than to the second end perimeter, and wherein the magnetic stripe extends between the first side perimeter and the second side perimeter. The compact transaction card may further include a textured grip along at least one of the first main side of the body and the second main side of the body, wherein the textured grip is positioned only on the second section of the body, and wherein the magnetic stripe is located only on the first section of the body.

In yet another approach according to the disclosure, a compact transaction card may include a body comprising a first main side opposite a second main side, an insertion end perimeter opposite a second end perimeter, and a first side perimeter opposite a second side perimeter, wherein a first axis extending between the first side perimeter and the second side perimeter defines a first section of the body and a second section of the body. The compact transaction card may further include an EMV chip along the first main side of the body and a magnetic stripe along the second main side of the body, wherein the magnetic stripe extends between the first side perimeter and the second side perimeter, and wherein the magnetic stripe is located only on the first section of the body. The compact transaction card may further include a textured grip along at least one of the first main side of the body and the second main side of the body, wherein the textured grip is positioned only on the second section of the body, and wherein the EMV chip is positioned between a perimeter of the textured grip and the insertion end perimeter.

BRIEF DESCRIPTION OF THE DRAWINGS

The accompanying drawings illustrate example approaches of the disclosure, including the practical application of the principles thereof, as follows.

Figure 1:
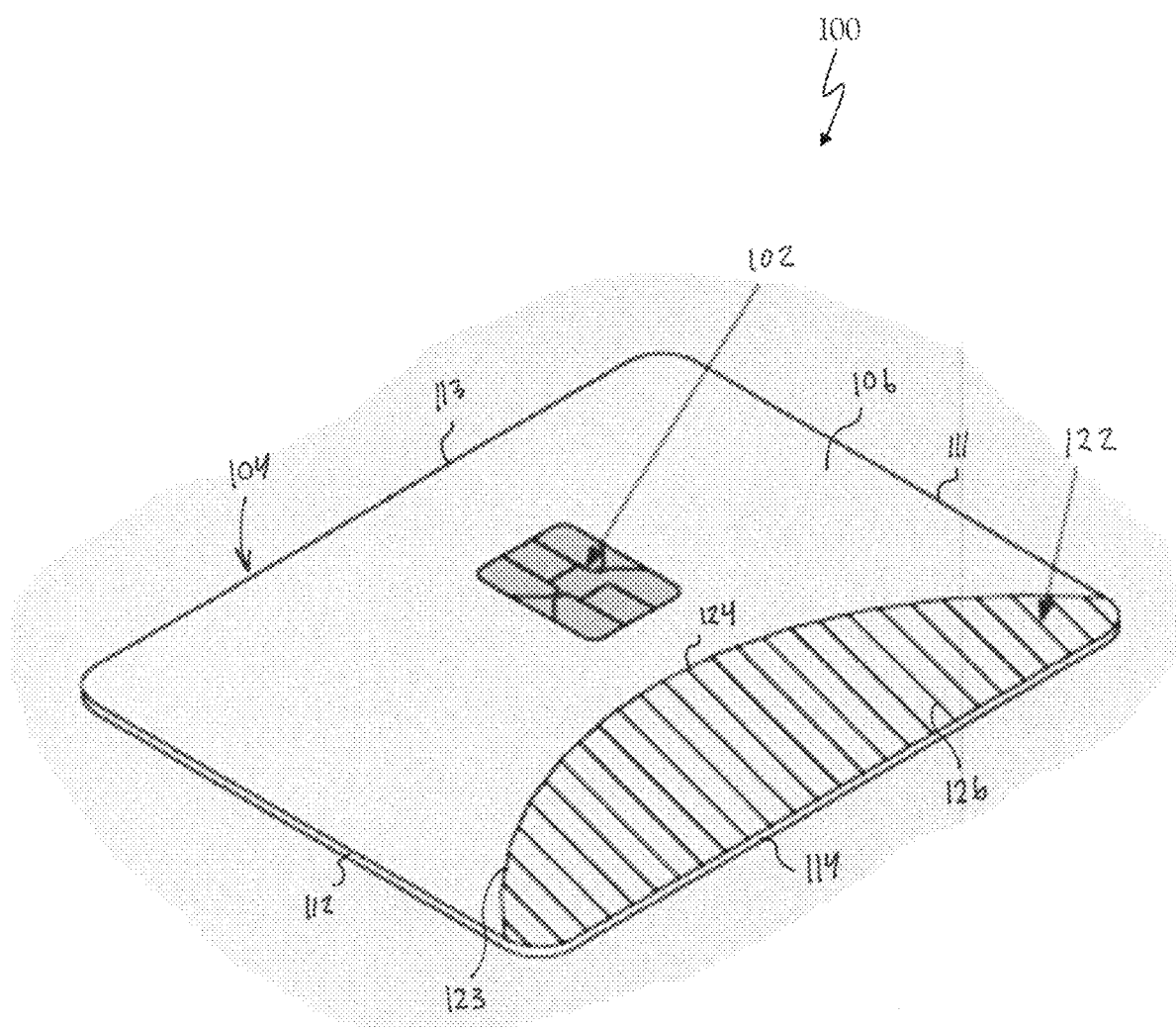
FIG. 1 is a top perspective view of a transaction card in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Transaction cards of the present disclosure may be approximately half the dimensions of traditionally sized transaction cards (e.g., 42.8×53.98 mm vs. 85.60×53.98 mm). As a result, two reduced-size transaction cards can sit next to one another in a person's wallet, ultimately saving space. In some embodiments, a textured grip may be provided along a front and/or back of the transaction card.

Figure 2:
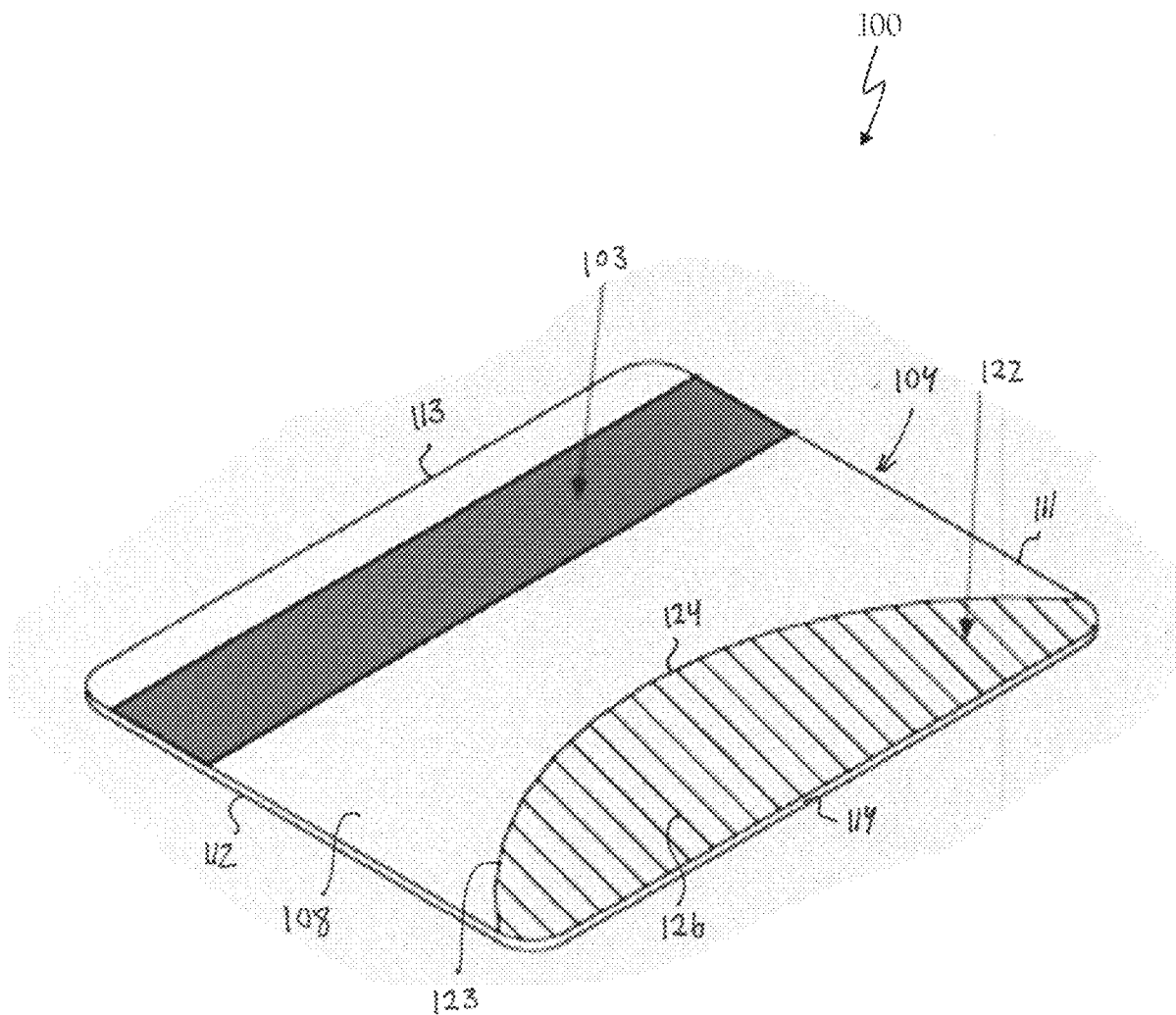
FIG. 2 is a bottom perspective view of a transaction card in accordance with embodiments of the present disclosure.

Referring now to FIGS. 1-2, an example transaction card (hereinafter "card") 100 according to embodiments of the disclosure will be described. Transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification chip 102, such as an EMV chip, the card 100 may also provide one or more functions requiring contact. For example, the card 100 may include a magnetic stripe 103 and/or a microchip connected to contacts present on an outer (e.g., back) layer of the card 100.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates, each card substrate may be formed of the same material. Alternatively, one or more card substrates may be formed of a different material.

As shown, the body 104 of the card 100 may include a first main side 106 opposite a second main side 108. Although non-limiting, the first main side 106 may correspond to a front or top side of the card 100, while the second main side 108 may correspond to a back or bottom side of the card 100. The body 104 may be defined by an outer perimeter including a first side perimeter 111 opposite a second side perimeter 112, and an insertion end perimeter 113 opposite a second end perimeter 114.

In some embodiments, the magnetic stripe 103 may be provided on the second main side 108 of the body 104, wherein the magnetic stripe 103 is part of an outer layer of the body 104. In other embodiments, the magnetic stripe 103 is part of a separate component or layer disposed atop or beneath the outer layer. As shown, the magnetic stripe 103 may extend between the first side perimeter 111 and the second side perimeter 112. The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation. Embodiments herein are not limited in this context.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may also include identifying indicia, such as an account holder name and/or a card number. Although non-limiting, the card number may be a 16-digit number (e.g., four groups of four digits). In other embodiments, the card number may include a different number of digits. The identifying indicia may be printed over/on an outer layer of the body 104. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

As further shown, the card 100 may include one or more textured grips 122 along the first main side 106 and/or the second main side 108 of the body 104. Each textured grip 122 may include a plurality of grip elements 126 (e.g., ridges, peaks, indentations, etc.) formed on an exterior surface of the body 104 to create a tactile feel for easier swiping of the card 100. The textured grip 122 also creates a design object as a visual indicator on the appropriate orientation for swiping the card 100. Although not limited to any particular shape or configuration, the textured grips 122 may have a curved perimeter 123 including a peak or crest 124 extending towards the identification chip 102. The textured grips 122 may further extend to the second end perimeter 114. In various embodiments, the textured grip 122 along the first main side 106 may be different or the same as the textured grip 122 along the second main side 108. In other embodiments, the textured grip may 122 be present only along one of the first or second main sides 106, 108.

In some embodiments, the textured grips 122 may be made from one or more layers of a clear coat resin. For example, the plurality of grip elements 126 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer(s) may be applied (or formed) by spraying, screen printing, painting, powder coating or any other like method, and cured or processed by UV cure, electron beam curing, oven heat, a radiation curing method, or in any other suitable manner. The plurality of grip elements 126 may be arranged in a variety of different patterns. Furthermore, the height and/or thickness of the plurality of grip elements 126 may vary in different locations of the textured grips 122.

Figure 3:
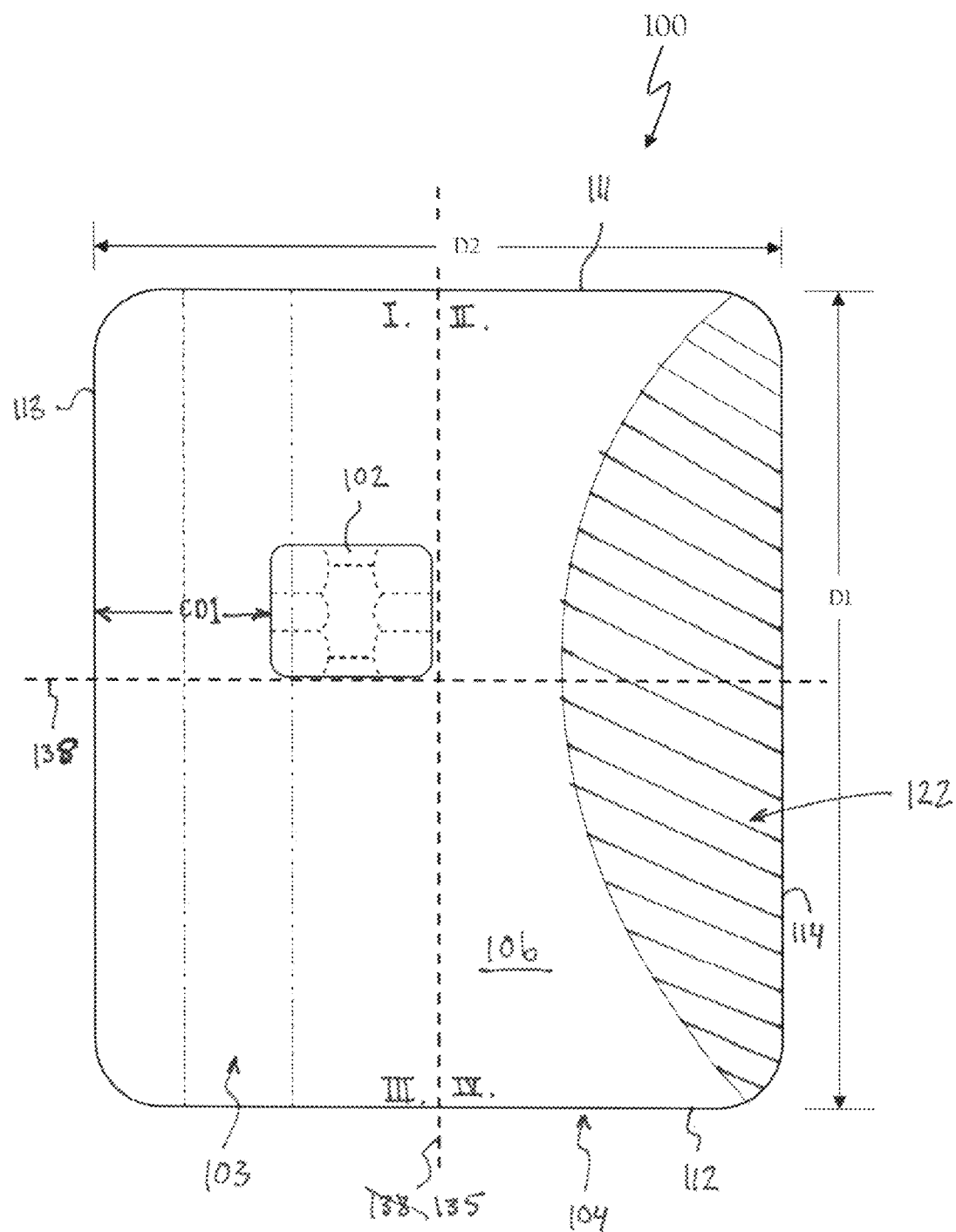
FIG. 3 is a top view of the transaction card in accordance with embodiments of the present disclosure.

FIG. 3 depicts a top view of the card 100. As shown, the body 104 may include four quadrants (I-IV) defined by a first axis 135 and a second axis 138. The first axis 135 may extend between the first side perimeter 111 and the second side perimeter 112, while the second axis 138 may extend between the insertion end perimeter 113 and the second end perimeter 114. As shown, the first axis 135 and the second axis 138 are perpendicular to one another. Quadrants I and III may define a first section of the body 104, while quadrants II and IV may define a second section of the body 104.

As shown, the textured grip 122 may be located only on or within the second section of the body 104. In some embodiments, the identification chip 102 and the magnetic stripe 103 may be located only on or within the first section of the body 104, wherein the magnetic stripe extends across the second axis 138. In some embodiments, the identification chip 102 may be located only within quadrant I. In other embodiments, the identification chip 102 may overlap the first axis 135 and/or the second axis 138. Furthermore, the identification chip 102 may be positioned a predefined distance 'CD1' from the insertion end perimeter 113. To enable the identification chip 102 of the card 100 to operate normally with existing chip reading devices (e.g., ATMs, kiosks, point-of-sale machines, etc.), CD1 may be selected to comply with one or more standards, such as ISO/IEC 7816. In some embodiments, the identification chip 102 overlaps the magnetic stripe 103 and is closer to the insertion end perimeter 113 than to the second end perimeter 114. Said differently, a projection of the identification chip 102, extending through the body 104 between the first main side 106 and the second main side 108, may partially intersect or overlap the magnetic stripe 103.

In some embodiments, a first length dimensions 'D1' of the insertion end perimeter 113 and the second end perimeter 114 is greater than a second length dimension 'D2' of the first side perimeter 111 and the second side perimeter 112. For example, D1 may be between 53 mm and 55 mm and D1 may be between 42 mm and 44 mm. A thickness of the body 104, between the first main side 106 and the second main side 108, may be approximately 0.76 mm.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 described herein may have non-standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in). The card 100 may differ from standard cards in that the dimensions may be, for example, 42.8×53.98 mm in the closed configuration and 83.72×53.98 mm in the open configuration. The card 100 may have a same or similar thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body comprising a first main side opposite a second main side, a first end perimeter opposite a second end perimeter, and a first side perimeter opposite a second side perimeter, wherein a first axis extending between the first side perimeter and the second side perimeter defines a first section of the body and a second section of the body; and
an identification chip along the first main side of the body and a magnetic stripe along the second main side of the body, wherein the magnetic stripe extends between the first side perimeter and the second side perimeter, and wherein the magnetic stripe and the identification chip are both located in the first section of the body, and the identification chip is at a predetermined distance from an insertion end perimeter, and the identification chip at least partially overlaps the magnetic stripe; and
a textured grip along at least one of the first main side of the body and the second main side of the body, wherein the textured grip is positioned only on the second section of the body, wherein the textured grip has a curved perimeter, and the textured grip comprises a plurality of grip-elements such that lengths of the grip-elements increase towards a center of the curved perimeter, and wherein the curved perimeter comprises a flat end and a curved end, the curved end extending towards the identification chip, and the flat end extending towards the second end perimeter of the body.

2. The transaction card of claim 1, wherein a first length dimensions of the first side perimeter is less than a second length dimension of the first end perimeter.

3. The transaction card of claim 1, wherein the textured grip extends to the second end perimeter.

4. The transaction card of claim 1, further comprising a second axis extending between the first end perimeter and the second end perimeter, wherein the second axis is oriented perpendicular to the first axis, and wherein the magnetic stripe extends across the second axis without extending across the first axis.

5. The transaction card of claim 1, wherein the identification chip is an EMV chip.

6. The transaction card of claim 1, wherein the textured grip comprises a curved perimeter including a crest extending towards the identification chip.

7. A compact transaction card, comprising:
a body comprising a first main side opposite a second main side, an insertion end perimeter opposite a second end perimeter, and a first side perimeter opposite a second side perimeter, wherein a first axis extending between the first side perimeter and the second side perimeter defines a first section of the body and a second section of the body; and
an identification chip along the first main side of the body and a magnetic stripe along the second main side of the body, wherein the identification chip is positioned closer to the insertion end perimeter than to the second end perimeter, wherein the magnetic stripe extends between the first side perimeter and the second side perimeter, and wherein a projection of the identification chip, extending through the body between the first main side and the second main side, overlaps the magnetic stripe; and
a textured grip along at least one of the first main side of the body and the second main side of the body, wherein the textured grip is positioned only on the second section of the body, and wherein the magnetic stripe is located only on the first section of the body, wherein the textured grip has a curved perimeter, and the textured grip comprises a plurality of grip elements such that lengths of the grip-elements increase towards a center of the curved perimeter, and wherein the curved perimeter comprises a flat end and a curved end, the curved end extending towards the identification chip, and the flat end extending towards the second end perimeter of the body.

8. The compact transaction card of claim 7, wherein a first length dimensions of the first side perimeter is less than a second length dimension of the insertion end perimeter.

9. The compact transaction card of claim 7, wherein the textured grip extends to the second end perimeter.

10. The compact transaction card of claim 7, further comprising a second axis extending between the insertion end perimeter and the second end perimeter, wherein the second axis is oriented perpendicular to the first axis, and wherein the magnetic stripe extends across the second axis without extending across the first axis.

11. The compact transaction card of claim 7, wherein the identification chip is an EMV chip.

12. The compact transaction card of claim 7, wherein the textured grip comprises a curved perimeter including a crest extending towards the identification chip.

13. A compact transaction card, comprising:
a body comprising a first main side opposite a second main side, an insertion end perimeter opposite a second end perimeter, and a first side perimeter opposite a second side perimeter, wherein a first axis extending between the first side perimeter and the second side perimeter defines a first section of the body and a second section of the body; and
an EMV chip along the first main side of the body and at least partially overlapping a magnetic stripe along the second main side of the body, wherein the magnetic stripe extends between the first side perimeter and the second side perimeter, and wherein the magnetic stripe is located only on the first section of the body; and
a textured grip along at least one of the first main side of the body and the second main side of the body, wherein the textured grip is positioned only on the second section of the body, and wherein the EMV chip is positioned between a perimeter of the textured grip and the insertion end perimeter, wherein the textured grip has a curved perimeter, and the textured grip comprises a plurality of grip-elements such that lengths of the grip-elements increase towards a center of the curved perimeter, and wherein the curved perimeter comprises a flat end and a curved end, the curved end extending towards the EMV chip, and the flat end extending towards the second end perimeter of the body.

14. The compact transaction card of claim 13, wherein a first length dimensions of the first side perimeter is less than a second length dimension of the insertion end perimeter.

15. The compact transaction card of claim 13, wherein the textured grip extends to the second end perimeter.

16. The compact transaction card of claim 13, further comprising a second axis extending between the insertion end perimeter and the second end perimeter, wherein the second axis is oriented perpendicular to the first axis, wherein the first axis and the second axis divide the body into quadrants, and wherein the magnetic stripe extends across the second axis, into a first quadrant and a second quadrant.

17. The compact transaction card of claim 13, wherein a projection of the EMV chip, extending through the body between the first main side and the second main side, overlaps the magnetic stripe.

18. The compact transaction card of claim 13, wherein the textured grip comprises a curved perimeter including a crest extending towards the EMV chip.

19. The compact transaction card of claim 13, wherein the EMV chip is positioned to be read upon insertion of the compact transaction card in a reader by being at a predetermined distance from the insertion end perimeter.

20. The compact transaction card of claim 7, wherein the identification chip is positioned to be read upon insertion of the transaction card in a reader by being at a predetermined distance from an insertion end perimeter.

* * * * *